United States Patent [19]
Morrison

[11] Patent Number: 4,526,036
[45] Date of Patent: Jul. 2, 1985

[54] CADENCE METER

[76] Inventor: Thomas R. Morrison, 137 Overlook St., Mount Vernon, N.Y. 10550

[21] Appl. No.: 405,327

[22] Filed: Dec. 30, 1983

[51] Int. Cl.³ .............................................. G01P 15/00
[52] U.S. Cl. .................................. 73/493; 73/517 R; 272/DIG. 5; 340/669
[58] Field of Search ....................... 324/160, 162, 178; 73/516 R, 517 R, 509, 379, 493; 272/DIG. 5; 340/669

[56] References Cited

U.S. PATENT DOCUMENTS

| | | | |
|---|---|---|---|
| 1,912,924 | 6/1933 | Utne et al. | 324/160 |
| 4,101,869 | 7/1978 | Henderson | 340/669 |
| 4,423,630 | 1/1984 | Morrison | 272/DIG. 5 |

OTHER PUBLICATIONS

"A Method of Measuring the Temporal/Distance Factors of Gait" by Wall et al., from Biomedical Engineering, Dec. 1976, pp. 409-412.

Primary Examiner—Stewart J. Levy
Assistant Examiner—John E. Chapman, Jr.

[57] ABSTRACT

A cadence meter senses acceleration pulses of a pedalled vehicle resulting from individual pedal strokes and produces an indication of the timing or frequency of pedalling.

15 Claims, 9 Drawing Figures

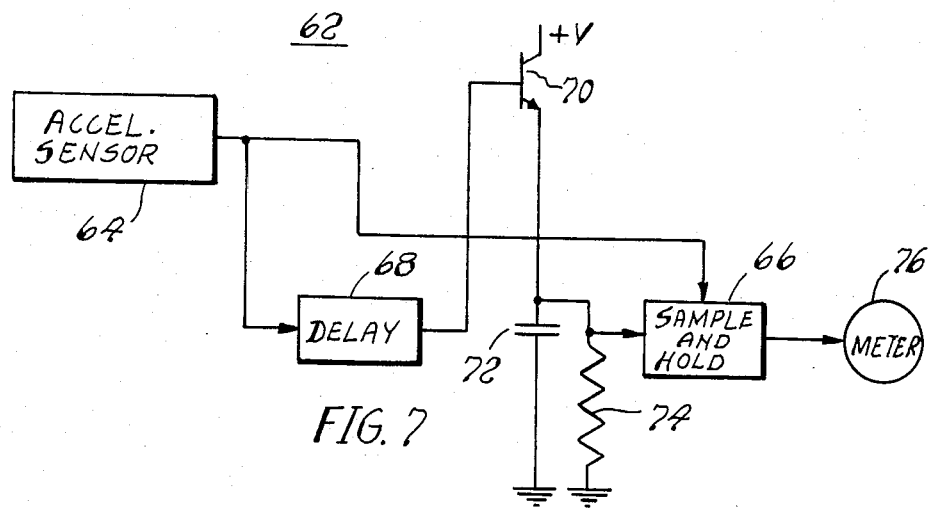
FIG. 7
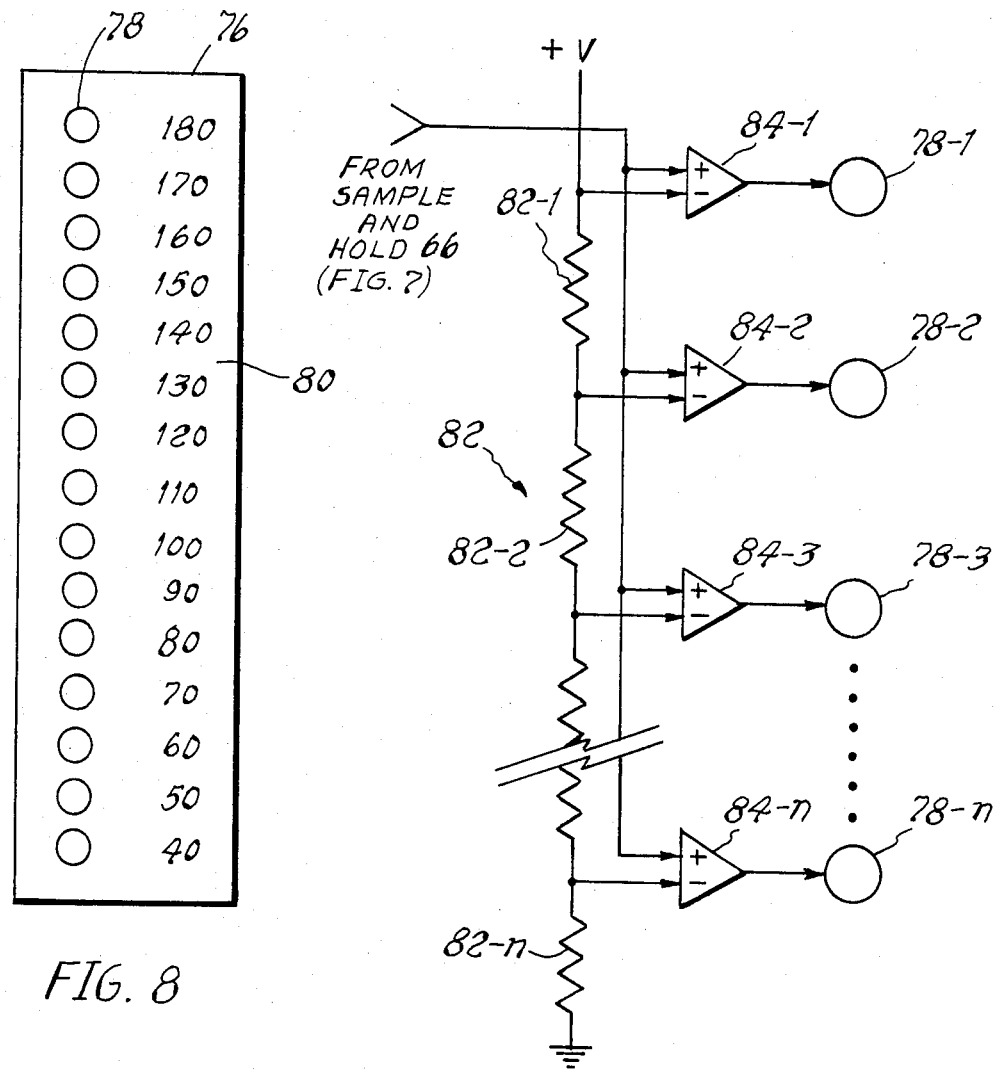
FIG. 8
FIG. 9

CADENCE METER

BACKGROUND OF THE INVENTION

For good endurance and maximum distance, a pedaller of a bicycle, for example, must strike an appropriate balance between pedal force, i.e. the force applied by the foot to the pedal, and cadence, i.e. the number of pedal strokes per unit time. Ideally, this balance should be maintained constant throughout the ride. That is, the pedal force and cadence should both remain constant. This is usually accomplished in outdoor conditions of varying slope and wind by appropriately changing gear ratios in a multi-speed bicycle.

It is difficult for a bicyclist to accurately estimate cadence. The difference between cadences of 80 and 140 strokes per minute (40 to 70 revolutions per minute of the pedal crank) is difficult to detect without instrumentation, but such differences may have a serious impact on the energy output of a cross-country bicyclist.

Since bicycles are frequently left unattended, bicycle accessories are frequently subject to theft.

In addition, any solution should be simple and quick to install without requiring mounting and interconnection of a large number of parts.

OBJECTS AND SUMMARY OF THE INVENTION

Accordingly, it is an object of the invention to provide apparatus for measuring and indicating pedalling cadence.

It is a further object of the invention to provide a cadence meter employing pedal-pulse acceleration for sensing pedal strokes.

It is a further object of the invention to provide a cadence meter in a single unitary container capable of being operably mounted on any non-rotating part of a bicycle.

According to an aspect of the present invention, there is provided a cadence meter for an object propelled by a pulsating force, comprising means for measuring acceleration produced by the pulsating force to produce an acceleration signal, means for measuring the elapsed time between successive occurrences of a predetermined condition of the acceleration signal, and means based on the elapsed time for measuring a cadence of the pulsating force.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is a second embodiment of a cadence meter in accordance with the present invention.

FIG. 8 is a front view of a meter scale employing discrete lights to indicate cadence.

FIG. 9 is a schematic diagram of a driver circuit for the light of FIG. 8.

DETAILED DESCRIPTION OF THE PREFERRED EMBODIMENT

Although the present invention is usable in any vehicle propelled by a pulsating force such as a rowboat, pogo stick, jogging runner and the like, for concreteness, the description which follows is directed to a pedal-powered bicycle.

Figure 1:
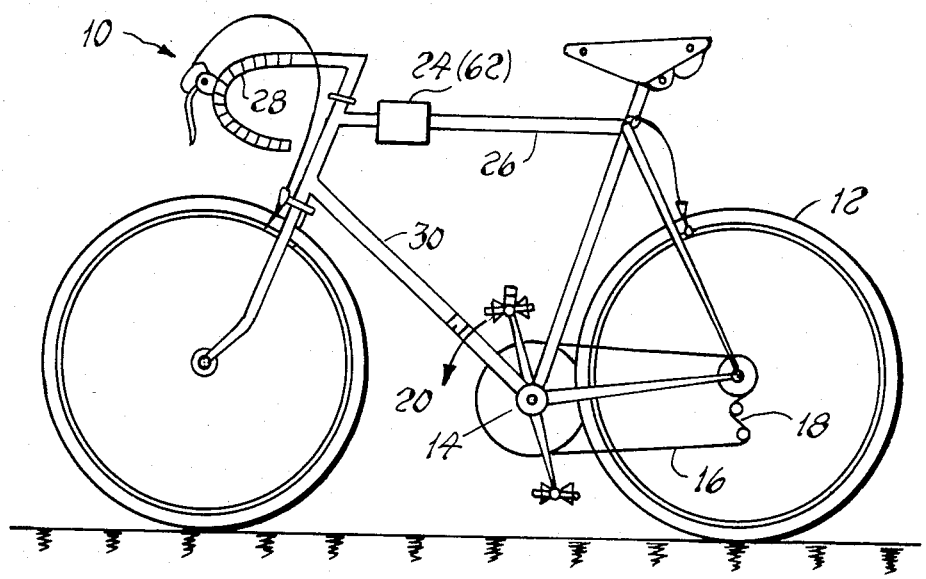
FIG. 1 is a side view of a bicycle suitable for use with the present invention.

Referring now to FIG. 1, there is shown a bicycle 10 of the multi-gear type commonly known as a 3-speed, 5-speed, 10-speed or other designation. Some versions of bicycle 10, typically 3-speed versions, have internal gearing in the hub of a rear wheel 12. Others have an arrangement of multiple concentric sprockets at rear wheel 12 and/or pedal crank 14 and a device for shifting a bicycle chain 16 from sprocket to sprocket to change the effective gear ratio. A spring loaded idler sprocket 18 takes up slack in the return run of bicycle chain 16.

The above described multi-gear bicycles are well known in the art and detailed description thereof is not required for a full understanding by one skilled in the art. A rider of bicycle 10 desires to maintain a constant desired pedal force indicated by an arrow 20, on each pedal stroke. As pedal crank 14 rotates through each half cycle, the effectiveness of pedal force 20 in producing torque at rear wheel 12 varies as a sine function from zero at a vertical position of pedal crank 14 to a maximum near the horizontal position of pedal crank 14.

Figure 2:
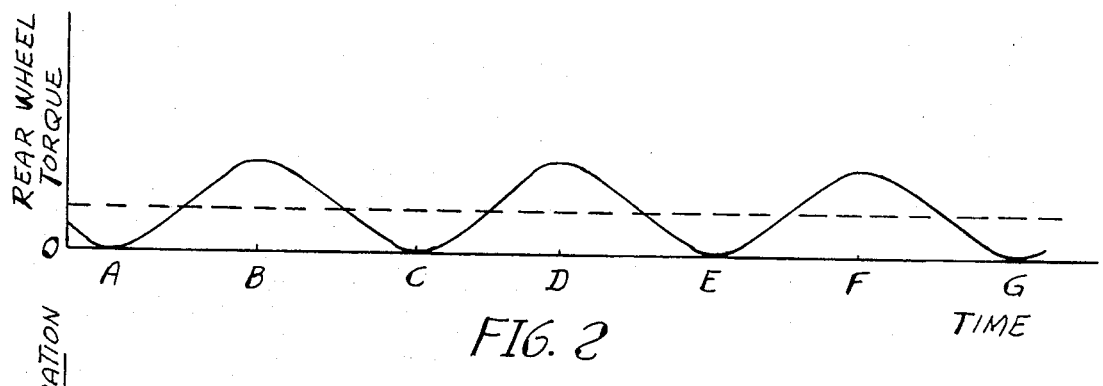
FIG. 2 is a curve showing the pulsation of torque applied to the rear wheel of a bicycle as a function of time.

Referring to FIG. 2, the manner in which rear wheel torque varies with time is seen to resemble a full-wave-rectified sine wave. At point A, it is assumed that pedal crank 14 is vertical with the right pedal high. From A to C, the right foot provides torque to the rear wheel reaching a peak at point B where pedal crank 14 is approximately horizontal. C also represents the point at which pedal crank 14 is vertical with the left pedal high. From C to E, the left foot descends yielding a torque pulse which peaks at point D when pedal crank 14 is approximately horizontal.

For a bicycle running at a constant average speed, the average torque required to overcome rolling and wind resistance is shown by a dashed line. With a pulsating torque as shown, the sum of longitudinal accelerations and decelerations must equal zero. Since the torque creating longitudinal acceleration above and below the average torque line varies over the pedalling cycle, the acceleration of bicycle 10 must correspondingly vary. During portions of low torque, rolling and wind resistance produce a net deceleration which must be restored by acceleration during portions of high torque. This is shown in the acceleration-deceleration curve of FIG. 3. Thus, it can be seen that acceleration changes frdm negative to positive and back to negative during each half revolution of pedal crank 14.

Referring momentarily to FIG. 1, a cadence meter 24 is attached to any convenient non-rotating part of bicycle 10 such as, for example, to crossbar 26, handlebar 28 or diagonal bar 30.

Figure 4:
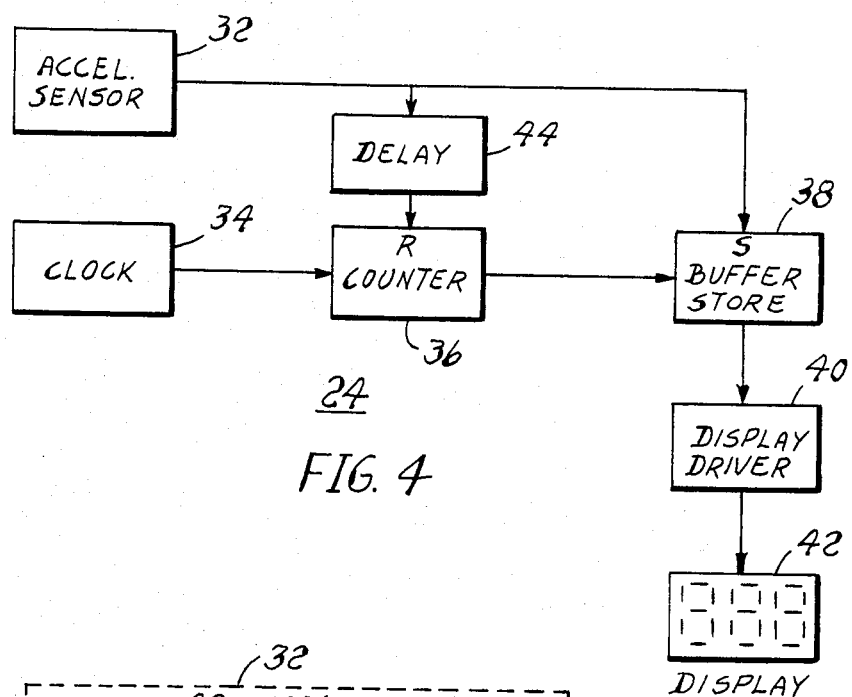
FIG. 4 is a block diagram of a cadence meter according to the present invention.

Referring now to FIG. 4, one embodiment of cadence meter 24 is shown. In the preferred embodiment, all elements of cadence meter 24 are contained in a unitary enclosure which is rigidly clamped or otherwise affixed to bicycle 10. An acceleration sensor 32, to be more fully described hereinafter, produces one narrow output pulse each time the longitudinal acceleration of bicycle 10 changes from negative to positive. A clock 34 of any convenient type such as, for example, a 555 integrated circuit timer, produces a continuous sequence of equally spaced clock pulses which are applied to the input of a counter 36 which counts these pulses. A digital number representing the number of clock pulses counted by counter 36 is periodically transferred to, and stored in, a buffer store 38. The digital number stored in buffer store 38 is applied to a display driver 40 which drives a conventional display such as a three-element, 7-segment display 42. Display 42 displays a decimal value representing cadence.

The narrow acceleration pulses from acceleration sensor 32 are applied to a store input S of buffer store 38 and to an input of a delay 44 such as, for example, a one-shot. The output of delay 44 is applied to the reset input R of counter 36.

When an acceleration pulse is generated, it immediately enables buffer store 38 to receive and store the digital number then existing in counter 36. After a short delay enforced by delay 44 to permit the above transfer to be completed, counter 36 is reset to predetermined initial condition and to thereafter again begin counting clock pulses in preparation for the next occurring acceleration pulse.

Although counter 36 is above described as a simple counter, its function is slightly more complex. Cadence is actually calculated as follows:

$$c = f/s$$

Where:
c=cadence in strokes/min.
f=clock frequency in pulses/min.
s=clock pulses per stroke Thus, after counting clock pulses between acceleration pulses to determine the value of s, this value of s must be divided into the clock frequency f to determine the value of cadence c. As is conventional, only the integral part of this quotient may be used by discarding or failing to display decimal values.

An exemplary value for f may be 10,000 clock pulses per minute (166.66 Hz). If finer resolution is required, a frequency of 1,666.66 Hz or higher decimal multiple may be employed. The division function may be performed in counter 36, buffer store 38, display driver 40 or in a separate divider unit (not shown). Alternatively, counter 36 may be a conventional microprocessor in which the counting and dividing function may be controlled by software.

Figure 5:
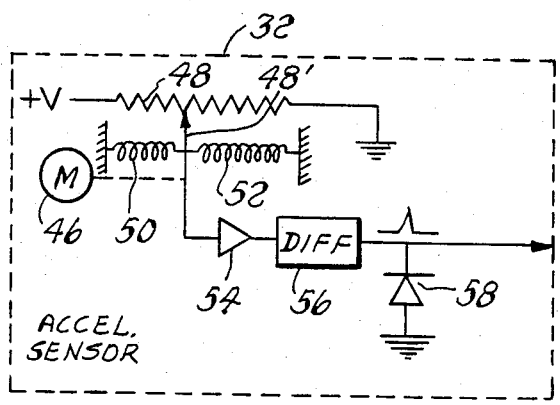
FIG. 5 is a detail block diagram of an acceleration sensor for use with the apparatus of FIG. 4.

Referring now to FIG. 5, one embodiment of acceleration sensor 32 is shown. A movable mass 46 is mechanically coupled to a movable contact 48' of a variable resistor 48 whose resistive element is connected between a voltage source +V and ground. Mass 46 is loosely resiliently urged to an equilibrium position by centering springs 50 and 52. Alternatively, mass 46 may be suspended vertically on a horizontal shaft with gravity being depended upon to provide restoring force.

Figure 3:
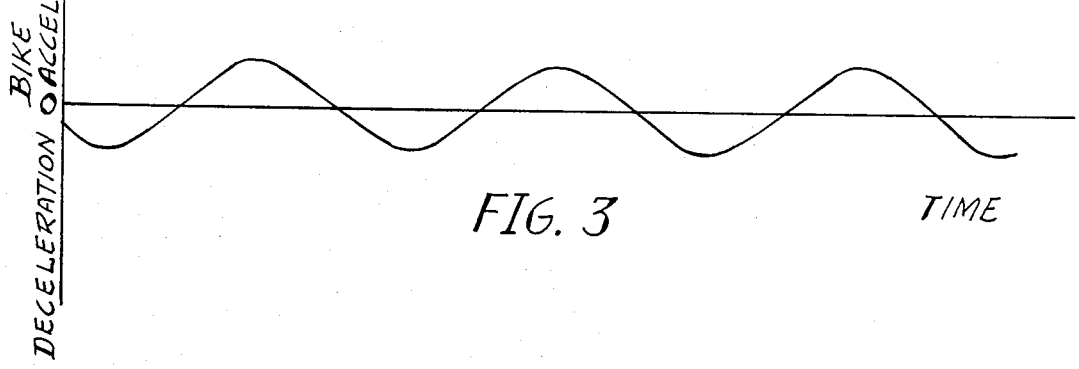
FIG. 3 is a curve showing the resulting acceleration and deceleration of the bicycle as a result of the torque pulsations in FIG. 2.

As the acceleration pulsations (FIG. 3) act to move mass 46 backward and forward in response to torque pulsations (FIG. 2), the voltage appearing at movable contact 48' has a shape approximating the acceleration pulsations of FIG. 3 possibly with its DC level shifted. The acceleration voltage thus produced may be amplified in an amplifier 54 which may also be effective to shift the DC level so that its output varies positively and negatively about zero. Such DC level shift can be conveniently accomplished by conventional AC coupling.

A further conventional function which may be performed in amplifier 54 includes filtering higher frequency AC components from the acceleration signal which may arise from road shocks transmitted to acceleration sensor 32. Such frequency filtering may also be performed mechanically as will be described.

The amplified and adjusted acceleration signal is applied to an input of a differentiator 56 which is effective to produce short positive-going and negative-going pulses or spikes as the acceleration signal goes respectively positive and negative. A diode 58 may be employed to suppress spikes of one polarity while permitting spikes of the other polarity to pass.

Instead of using a simple differentiator, the function of differentiator 56 may be performed by a conventional Schmitt trigger which is effective to produce a short output pulse each time the acceleration signal passes through zero.

Figure 6:
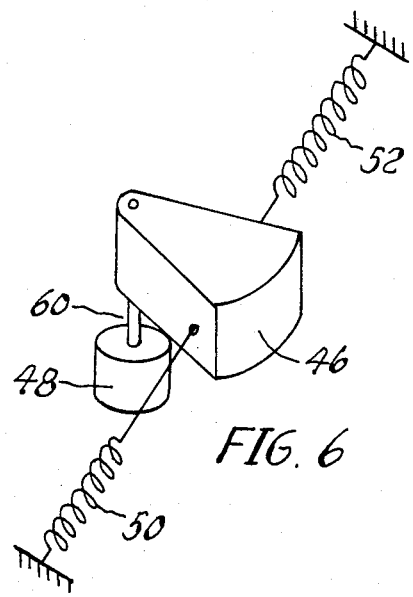
FIG. 6 is a perspective view of one form of an apparatus for producing an electrical signal responsive to longitudinal acceleration.

Referring now to FIG. 6, mass 46 is seen to be an unbalanced mass supported near one extremity on a shaft 60 of variable resistor 48. The equilibrium position of mass 46 places a line joining its center of gravity to the axis of shaft 60 approximately normal to the fore and aft axis of the bicycle on which it is mounted.

A practical maximum pedalling rate is about 400 to 500 pedal strokes per minute (about 6.6 to about 8 per second). In order to avoid spurious responses due to road shock, etc. in the output of variable resistor 48, motion of mass 46 may be damped. One way of accomplishing this is to place mass 46 in a chamber containing a fluid having a suitable viscosity to damp high rate motion. An alternative way of accomplishing this result without filling a chamber with fluid includes passing shaft 60 through a stationary tube (not shown) having a material of high dynamic viscosity in the annular space between the tube and shaft 60. For example, an appropriate amount of dimethylpolysiloxane having a dynamic viscosity of, for example, 100,000 centistokes may be employed.

The mechanical damping discussed in the preceding paragraph may be employed instead of, or as a supplement to, the electrical filtering previously detailed.

Referring now to FIG. 7, there is shown a cadence meter 62 employing a simple RC charge-discharge system for measuring cadence. Although the accuracy of this technique is inferior to the digital system previously described, its lower cost may make it attractive under some circumstances.

An acceleration sensor 64 produces a sequence of pulses corresponding to, for example, the positive-going zero crossings of the acceleration signal. These pulses are connected directly to the control input of a sample and hold 66 and to a delay 68. Delay 68 may be of any convenient type such as first and second cascaded one-shots. Delay 68 produces a fixed-duration positive output pulse beginning a predetermined time after receipt of an input pulse. The fixed-duration output pulse of delay 68 is applied to the base of a transistor 70. The collector-emitter path of transistor 70 is connected in series from a voltage supply +V to a timing capacitor 72. A timing resistor 74 shunts charge in timing capacitor 72 to ground at a rate determined by the RC time constant of timing capacitor 72 and timing resistor 74.

The voltage at the junction of timing capacitor 72 and timing resistor 74 is applied to the signal input of sample and hold 66. The output of sample and hold 66 is applied to a meter 76, suitably calibrated in terms of cadence.

Upon receiving a positive input pulse at its base, transistor 70 applies substantially the entire supply voltage +V through its collector-emitter path to charge timing capacitor 72 to the full supply voltage +V. At the end of its input pulse, transistor 70 cuts off further voltage supply to timing capacitor 72 which then begins discharging through timing resistor 74.

When the next pulse is produced by acceleration sensor 64, sample and hold 66 accepts and stores the voltage then existing at the junction of timing capacitor 72 and timing resistor 74. Timing capacitor 72 is then again charged to full supply potential in preparation for the next measurement cycle.

Sample and hold 66 may be effective to average several measurements of cadence to smooth the indication in the presence of variation in actual cadence.

Meter 76 may be of any convenient type responsive to voltage and appropriately interpretable in terms of cadence. For example, a conventional D'Arsonsval meter may be employed for meter 76. Other display devices may be employed without departing from the spirit and scope of the invention. For example, a meter 76 shown in FIG. 8 includes a plurality of lights 78 on a scale appropriately calibrated in terms of cadence. Lights 78 may be light-emitting diodes each energized when the input voltage thereto exceeds a predetermined value.

A suitable device for controlling lights 78 of FIG. 8 is shown in FIG. 9. A resistive ladder network 82 consisting of n resistors 82-1, 82-2 to 82-n are connected in series between a supply voltage +V and ground, the junctions of resistors are respectively connected to negative inputs of comparators 84-1 to 84-n. The signal from sample and hold 66 is applied in parallel to the positive inputs of comparators 84-1 to 84-n.

As the input voltage increases, the voltage fed to the positive inputs of more of comparators 84-1 to 84-n exceeds the reference voltages fed to their negative inputs from resistive ladder network 82. Each comparator whose positive input receives a voltage exceeding the reference voltage at its negative input produces an output which energizes its respective light 78-1 to 78-n. Thus, as the input voltage increases, more of lights 78-1 to 78-n are illuminated in response thereto and a lighted bar-like indicator is produced.

Although all of resistors 82-1 to 82-n may have the same value, it is also possible to shape the response of the device by varying the values of resistors 82-1 to 82-n in a fashion which produces an approximation of the inverse of the exponential voltage decay curve of an RC timing circuit. Thus, equal changes in indication will be produced by equal changes in cadence rather than the exponential relationship which may otherwise exist.

Although acceleration sensors 32 and 64 have been described in terms of a pendant weight system, it would be clear to one skilled in the art that the sensed acceleration is due to small increasing and decreasing changes in vehicle velocity. Thus, instead of sensing acceleration directly, it is possible to derive acceleration from a velocity signal. On a bicycle equipped with an electronic speedometer of the type, for example, employing a tone wheel effective to generate a frequency related to vehicle speed, the signal from the tone wheel may be detected to produce a DC signal varying with velocity. If this DC velocity signal is differentiated and suitably filtered, the result is a signal varying with vehicle acceleration. The output of such an acceleration sensor can be differentiated or examined for zero crossings produce output signals which are further processed as previously described.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cadence meter for an object propelled by a pulsating force, comprising:
means for measuring acceleration produced by said pulsating force to produce an acceleration signal;
means for measuring the elapsed time between successive occurrences of a predetermined condition of said acceleration signal; and
means based on said elapsed time for measuring a cadence of said pulsating force.

2. A cadence meter according to claim 1 wherein said means for measuring acceleration includes a mass, means for permitting motion of said mass relative to said object in response to said acceleration, and means for producing an electrical signal in response to said motion.

3. A cadence meter according to claim 2, wherein said means for permitting motion includes an axis, said mass being rotatable about said axis.

4. A cadence meter according to claim 3, further comprising means for restoring said mass to an equilibrium position.

5. A cadence meter according to claim 4, wherein said means for restoring includes at least one spring.

6. A cadence meter according to claim 4, wherein said means for restoring includes gravity acting on said mass.

7. A cadence meter according to claim 2, wherein said means for producing an electrical signal includes a variable resistor.

8. A cadence meter according to claim 1, wherein said means for measuring acceleration includes damping means for reducing interference in said acceleration signal.

9. A cadence meter according to claim 8, wherein said damping means includes electrical filtering.

10. A cadence meter according to claim 1, wherein said means for measuring the elapsed time includes a resistive-capacitive charge-discharge device.

11. A cadence meter according to claim 1, wherein said means for measuring the elapsed time includes a clock operative to produce clock pulses having a frequency and a counter operative to count a number of said clock pulses between successive occurrences of a predetermined condition of said acceleration signal.

12. A cadence meter according to claim 11, wherein said means based on said elapsed time is a divider.

13. A cadence meter according to claim 12, wherein said divider is effective to divide a constant related to said frequency by said number of said clock pulses between successive occurrences of said predetermined condition.

14. A cadence meter according to claim 1, wherein said means for measuring acceleration includes means for producing a velocity signal proportional to a velocity of said object and differentiating means responsive to said velocity signal to produce said acceleration signal.

15. A cadence meter for an object propelled by a pulsating force, comprising:

means for producing a velocity signal proportional to a velocity of said object;

means responsive to said velocity signal for producing an acceleration signal;

means responsive to variations in said acceleration signal for determining the time between a predetermined condition of said acceleration signal; and means based on said time for measuring a cadence of said pulsating force.

* * * * *